United States Patent [19]
Reck

[11] Patent Number: 5,948,828
[45] Date of Patent: Sep. 7, 1999

[54] TECHNOLOGY DEVELOPMENT AND CONSULTANCY

[75] Inventor: Werner Reck, Guben, Germany

[73] Assignee: Hoechst Aktiengesellschaft and Werner Reck, Technologie Entwicklung und Beratung, Germany

[21] Appl. No.: 08/891,187

[22] Filed: Jul. 10, 1997

Related U.S. Application Data

[63] Continuation-in-part of application No. 08/543,129, Oct. 13, 1995, abandoned.

[30] Foreign Application Priority Data

Oct. 17, 1994 [DE] Germany ............................. 44 37 043

[51] Int. Cl.$^6$ ..................................................... C08J 11/04
[52] U.S. Cl. ............................................. 521/48.5
[58] Field of Search ............................................. 521/48.5

[56] References Cited

U.S. PATENT DOCUMENTS

| | | | |
|---|---|---|---|
| 4,439,550 | 3/1984 | Brennan | 521/131 |
| 4,442,237 | 4/1984 | Zimmerman et al. | 521/48.5 |
| 4,444,919 | 4/1984 | Brennan | 521/172 |
| 4,469,824 | 9/1984 | Grigsby, Jr. et al. | 521/173 |
| 4,540,768 | 9/1985 | Speranza et al. | 528/79 |
| 4,546,169 | 10/1985 | Chandler | 528/272 |
| 4,608,432 | 8/1986 | Magnus | 528/274 |
| 4,701,477 | 10/1987 | Altenberg et al. | 521/48.5 |
| 4,720,571 | 1/1988 | Trowell | 560/91 |

FOREIGN PATENT DOCUMENTS

| | | |
|---|---|---|
| 0 152 915 | 8/1985 | European Pat. Off. . |
| 0 248 570 | 12/1987 | European Pat. Off. . |
| 3 435 014 | 3/1986 | Germany . |

OTHER PUBLICATIONS

J. S. Canaday and M. J. Skowronski, "A Comparison of Aromatic Polyester Polyols for Rigid Urethan and Isocyanurate Foam", Journal of Cellular Plastics, pp. 339–345, Sep. 1985.

Kagaku Kaishi, "Studies on reaction of carboxylic acid with epoxide v. Reaction of terephthalic acid with ethylene oxide", Physical Organic Chemistry, p. 6, (1981).

Gilles Tersac, Franck Hubert, Gerard Durand, "Polyols by polyesterfication of glycolysis products of polyethyleneterephthalate, Their Physicochemical Properties and Resultant Polyurethane Foams", Cellular Polymers, Bd 14, Nr. 1, pp. 14–40. (Jan. 1, 1995).

Chemical Abstracts, vol. 95, No. 11, Sep. 14, 1981, Columbus, Ohio, abstract No. 96496.

Odian, G., Principles of Polymerization, 1981, pp. 102–105.

*Primary Examiner*—Patrick D. Niland
*Attorney, Agent, or Firm*—Connolly & Hutz

[57] ABSTRACT

A process is described for preparing polyols in the form of bifunctional aromatic polyester alcohols from PET wastes and wastes from PET production. The process comprises dissolving the PET wastes in diethylene glycol (DEG), with the ratio of wastes to DEG being selected in such a way that the polyester alcohol obtained after the subsequent transesterification has a hydroxyl number (OHN) greater than 700 mg KOH/g, transesterifying the wastes dissolved in DEG and, if required or if desired, freed of solids, using known transesterification catalysts, with the ethylene glycol (EG) liberated in the process being at least partially distilled off, and distilling off free DEG at a temperature of below 140° C. from the transesterification product at equilibrium until a polyester alcohol having an OHN of 260–500 mg KOH/g is obtained.

12 Claims, No Drawings

TECHNOLOGY DEVELOPMENT AND CONSULTANCY

This is a Continuation In Part of application Ser. No. 08/543,129 filed Oct. 13, 1995 now abandoned.

The invention relates to polyols in the form of bifunctional aromatic polyester alcohols having a combination of a relatively low hydroxyl number (OHN) and a content of relatively low molecular weight oligomers, and also a process for their preparation from polyethylene terephthalate (PET) wastes or from wastes from PET production.

Aromatic polyester alcohols are valuable substances which are widely used in industry, preferably as part of the so-called A component for the production of polyurethane rigid foam. They increase the flame resistance and the stiffness of the foam. Various processes exist for preparing these valuable compounds, in which processes primary raw materials are used exclusively or partially as starting materials.

In processes for preparing bifunctional aromatic polyester alcohols in which exclusively primary raw materials are used as starting materials, essentially phthalic anhydride (anhydride of orthophthalic acid) is used as acid component in combination with diethylene glycol (DEG) as dihydric alcoholic component.

The literature also discloses various proposals for using terephthalic acid from polyethylene terephthalate wastes as acid component for preparing polyols. These processes are based on the glycolysis of the polyester wastes and transesterification using DEG.

The terephthalic acid-polyester alcohols prepared by these processes differ in their physical behavior from polyester alcohols based on orthophthalic acid particularly in respect of their storage stability. Thus, after a storage time of only a few days, increasing amounts of solids precipitate from the initially liquid terephthalic acid-polyester alcohols prepared by glycolysis and transesterification of PET waste with DEG, if they have a hydroxyl number (OHN) range suitable for further processing, and these solids finally cause the product to change into a sludge-like consistency.

To circumvent this disadvantage, a series of processes for preparing polyester alcohols have been proposed in which, in addition to terephthalic acid based on PET wastes, further aromatic or aliphatic dicarboxylic acids are used. Thus, for example, the publications U.S. Pat. No. 4,608,432, U.S. Pat. No. 4,546,169 and EP-A-0152915 describe polyol mixtures prepared from phthalic anhydride, PET wastes and DEG. The documents U.S. Pat. No. 4,439,550, EP-A-0248570 and DE-C-3435014 propose adipic acid, glutaric acid, succinic acid and isophthalic acid as sole or combined added components in addition to phthalic anhydride. The molar proportion of such additional dicarboxylic acids is here generally 50% and more, based on the total acid content.

A further proposal for obtaining storage-stable terephthalic acid-polyester alcohols provides for use of, apart from DEG, glycols having a higher molecular mass for the glycolysis and transesterification process. U.S. Pat. No. 4,444,919 describes a PET glycolysate based on DEG and triethylene glycol. U.S. Pat. No. 4,469,824 proposes the use of a mixture of DEG and dipropylene glycol.

Processes which use a combination of both routes have also become known. Thus, U.S. Pat. No. 4,720,571 provides for reacting a mixture of PET waste and DMT production residues (mixture of predominantly methyl esters of isophthalic, orthophthalic and terephthalic acid) with at least two higher glycols.

All these proposals have the serious disadvantage that, apart from the PET wastes, valuable and expensive primary raw materials have to be used. When aliphatic dicarboxylic acids or glycols having a higher molecular mass than DEG are used, a further disadvantage is reduction of the aromatic content in the polyol and thus a lessening of the positive effects resulting from the use of aromatic polyester alcohols, e.g. in polyurethane production.

It is known that polyester alcohols are not a uniform product in respect of their molecular mass. As for the polyester high polymers, the molecular masses have a distribution which has been mathematically formulated by Schulz and Flory. From this functional relationship it can be derived that with increasing OHN the equilibrium is shifted continually further in favor of the free DEG content at the expense of the content of higher oligomers. In concrete terms, this means that the maximum in the curve of the molecular mass distribution of a polyester alcohol based on terephthalic acid and DEG, for example having an OHN of 315 mg KOH/g, lies at the monomeric diester, with about 14% by weight of free DEG and an oligomer content decreasing with increasing degree of polymerization up to the degree of polymerization 10 being present in the equilibrium mixture. Such a product is not storage stable.

Only those glycolysates having an OHN of above 700 mg KOH/g have been found to be storage stable. Polyols having such a high OHN are, however, unsuitable for the reaction with diisocyanates owing to the existing equivalence relationships.

It is an object of the present invention to provide polyols in the form of aromatic polyester alcohols in which the acid component consists essentially of terephthalic acid from PET wastes or wastes from PET production and the diol component consists essentially of DEG and which, despite this composition, have a good storage stability.

This object is achieved according to the invention by a process which makes possible the preparation of polyester alcohols which differ significantly in their molecular weight distribution from the products obtained in processes known hitherto. While known products, as indicated above, have, owing to the equilibrium reaction, a molecular mass distribution which is completely or approximately determined by the position of the chemical equilibrium, which corresponds to the OHN set in each case, the products of the invention contain a considerably lower proportion of relatively high molecular weight oligomers.

The present invention accordingly provides a process for preparing polyols in the form of bifunctional aromatic polyester alcohols from PET wastes and wastes from PET production, which comprises:

dissolving the wastes in diethylene glycol, with the ratio of wastes to diethylene glycol being selected in such a way that the polyester alcohol obtained after the subsequent transesterification has a hydroxyl number greater than 700 mg KOH/g, transesterifying the wastes dissolved, in DEG and, if required or if desired, freed of solids, using known transesterification catalysts, with the ethylene glycol liberated in the process being at least partially distilled off, and distilling off free DEG at a temperature of below 140° C. from the transesterification product at equilibrium until a polyester alcohol having an OHN of 260–500 mg KOH/g is obtained.

The process of the invention is based on the surprising discovery that the equilibrium ratio between monomeric diester and oligomers established at relatively high hydroxyl numbers, for example at an OHN of >700 mg KOH/g, is retained if the free DEG is distillatively removed at a temperature of below 140° C., preferably a maximum of 130° C., and the OHN is thus reduced to the desired value. The removal of the DEG at this temperature is possible according to the invention if the process is carried out at a pressure of less than 2 hPa, preferably less than 1 hPa. This gives polyester alcohols which, depending on the completeness of the DEG removal, can be adjusted in a targeted manner to OHN values of 260–500 mg KOH/g. The products obtained show no precipitation of solids even after prolonged storage.

By means of HPLC using tetrahydrofuran/water as eluant, the changes which had occurred in the molecular mass distribution were visibly confirmed. While the distribution curve for a product at equilibrium having an OHN of 315 mg KOH/g extended to oligomers having a degree of polymerization ($P_n$) of 10, for the product of the invention it falls to virtually zero, or at least to extraordinarily low values, at oligomers having a degree of polymerization of above 6. The proportion of oligomers having a degree of polymerization above 6 derived therefrom for the polyols of the invention would generally have to be below 1% by weight, preferably below 0.5% by weight, based on the total oligomer content.

The chromatograms of the HPLC analysis of a typical polyol of the invention and a conventionally prepared polyol having the same OHN give, for example, the values shown in the following comparison for the proportions of oligomers, based on the total oligomer content (i.e. without monomeric diesters):

Proportions of oligomers, based on the total oligomer content.

| Degree of polymerization $P_n$ of the oligomer | Conventionally prepared polyol | Polyol of the invention |
|---|---|---|
| $P_n = 6$ | 5.6% by weight | 0.9% by weight |
| $P_n > 6$ | 7.0% by weight | not detectable |

If the product of the invention is reheated, at temperatures above 140° C. a rise in the DEG content and thus a gradual reestablishment of the equilibrium applicable to the OHN are found. At a temperature of 230° C., the full equilibrium is reestablished within a short time. The product properties then correspond to those of a terephthalic acid-polyester alcohol prepared by known methods.

The process of the invention is carried out by first dissolving the wastes in a reactor, advantageously provided with a stirrer, at atmospheric pressure and under a blanket of nitrogen. For high-polymer material, temperatures of up to 250° C. are advantageous for this purpose, for low molecular weight distillation residues, temperatures of up to 205° C. are sufficient. The amount of DEG is to be set so as to ensure achievement of an OHN of greater than 700 mg KOH/g after the subsequent transesterification process. For this purpose, depending on the equipment, a molar ratio of PET (based on the unit molecular mass of 192 g/mol) to DEG of from 1:5 to 1:10, preferably 1:6.6 to 8.0, is required.

It can be advantageous to carry out the dissolution process using only part of the required amount of DEG and to add the remainder only just before the transesterification stage. This applies particularly to distillation residues from PET production having a greatly fluctuating composition, where the remaining amount of DEG required can only be established after the dissolution process via the determination of the saponification number and the terephthalate content derived therefrom.

If required and desired, the wastes are filtered after complete dissolution, with the filtration conditions being dependent on the degree of contamination. In the case of $TiO_2$-containing wastes and also in the case of distillation residues, the use of special filtration media is necessary for achieving a clear filtrate. For example, a mixture of equal parts of macerated cellulose, crystalline microcellulose and purified kieselguhr has been found to be useful as filter layer for this purpose.

Subsequently, in a glycolysis and transesterification process, the ethylene glycol (EG) present is liberated from the filtrate and is removed by distillation. The substantial removal of the EG is advantageous to obtain products of low viscosity and to avoid with certainty the precipitation of solids. The intention is to achieve an EG content of at most 10%, advantageously at most 5%, in the final product. For the transesterification process to proceed rapidly, use is made of known catalysts, for example tetrabutyl titanate, cobalt acetate, manganese acetate or zinc oxide.

The glycolysis and transesterification process can be carried out, for example, in a heatable stirred reactor which is equipped with a distillation column. The column should have a sufficient separating action to keep the DEG content of the EG distilling off as low as possible. The process requires a partial vacuum whose degree is partially determined by the flow resistance of the column and is advantageously to be set so that a product temperature of above 210° C., preferably above 225° C., for example 230–235° C., is reached in the last phase of the transesterification process. Chromatographic studies have shown that only at this temperature is the proportion of oligomers lowered to the equilibrium state within an industrially useful reaction time. Depending on the equipment, the pressure required for this purpose can be in a range of 500–750 hPa.

After conclusion of the EG removal, the reactor contents are cooled to below 140° C. and, with circumvention of the column, the DEG is distilled off at a residual pressure of, for example, 1 hPa and a product temperature of below 140° C., preferably at most 130° C., until the OHN desired for the product is reached. This can lie as desired in a range of 260–500 mg KOH/g. The product is then discharged.

The process of the invention can be used for PET wastes, for example bottles, films, tapes, film material and fibers, and also for wastes from PET production, for example distillation residues in processing of vapors, casting scrap, residues from dedusting of chips and faulty batches. It has the advantage of better economics since raw materials used are only the waste material and DEG which represents, as byproduct from EG production, a cheap diol. A further advantage of the process of the invention is the low viscosity of the polyester alcohols prepared thereby in comparison with polyester alcohols of identical OHN prepared by known processes.

This invention further provides the storage-stable polyol which can be prepared by the above-described process of the invention in the form of a bifunctional aromatic polyester alcohol. This product of the invention has an OHN within a range of 260–500 mg KOH/g and has a content of higher oligomers which is below the equilibrium content corresponding to the respective OHN. Preference is given to those polyols of the invention which, based on the total oligomer content, contain not more than 1% by weight, preferably not more than 0.5% by weight, of oligomers having a degree of polymerization of greater than 6, in particular those which are virtually free of oligomers having a degree of polymerization of greater than 6. Furthermore, preference is given to those storage-stable polyols of the invention whose content of free and bound EG is at most 10% by weight.

The polyols of the invention are suitable for all industrial applications in which the use of polyols having a relatively low OHN and a very low proportion of relatively high molecular weight oligomers is required or desired, preferably, for example, as constituent of the A component in the production of polyurethanes, in particular of polyurethane foams. The following examples illustrate particularly advantageous embodiments of the process of the invention.

EXAMPLE 1

1,000 g of PET bottle wastes were dissolved in 3,700 g of DEG in a 6 l capacity reaction vessel at a temperature of up to 240° C. while stirring and under a blanket of nitrogen. After conclusion of the dissolution process, the product was cooled to 180° C. and separated from the solid impurities by filtration via a suction filter lined with filter paper.

The filtrate was transferred into a heatable stirred reactor, likewise having a capacity of 6 l, with a column fitted on top and, after addition of 200 mg of tetrabutyl titanate, was heated under a pressure of 680 hPa. The column was equipped with 10 bubble-cap trays and a heatable outer jacket. After reaching a temperature of 225° C., EG started to distill off in association with the glycolysis and transesterification process going to completion. After adjusting the column jacket temperature to 186° C. and regulation of the temperature at the top likewise to 186° C. by varying the reflux ratio, the EG distilling off could be substantially separated from DEG. The product temperature increased with the amount of EG distilled off and at the end of the process was 235° C. at a temperature at the top which had fallen to 175° C. The transesterification product had an OHN of 728 mg KOH/g. The product was subsequently cooled to 130° C. and the free DEG was distilled off with circumvention of the column by gradually increasing the vacuum. The pressure at the end of the distillation process was 0.2 hPa, the temperature of the product was 130° C.

This gave 1,770 g of a pale yellow polyol having an acid number of 0.9 mg KOH/g, an OHN of 325 mg KOH/g and a viscosity at 25° C. of 2,100 mPa·s. No solids precipitated from the product during storage.

EXAMPLE 2

1,808 g of distillation residues from the vapor processing of PET production were dissolved in the same amount of DEG in a 6 l capacity reaction vessel at a temperature of 205° C. while stirring and under a blanket of nitrogen. The highly turbid solution was subsequently cooled to 180° C. and filtered through a suction filter having a filter layer consisting of a mixture of 25 g each of macerated cellulose, crystalline microcellulose and purified kieselguhr.

The clear filtrate, obtained in an amount of 3,597 g, had a saponification number of 228.5 mg KOH/g, corresponding to a terephthalic acid content of 33.9%. To achieve the desired OHN of greater than 700 mg KOH/g after conclusion of the transesterification process, the filtrate was admixed with 2,795 g of DEG, taking into account the amount of DEG already present in the distillation residues, and 360 mg of tetrabutyl titanate as transesterification catalyst.

The mixture was further treated in a similar manner to Example 1, with the transesterification product having an OHN of 709 mg KOH/g.

This gave 2,274 g of pale brown polyol having an acid number of 1.1 mg KOH/g, an OHN of 305 mg KOH/g and a viscosity at 25° C. of 3,500 mPa·s. No solids precipitated from the product on storage.

I claim:

1. A process for preparing polyols in the form of bifunctional aromatic polyester alcohols from PET wastes and wastes from PET production, which comprises the steps of:

dissolving the wastes in diethylene glycol (DEG), with the ratio of wastes to DEG being selected in such a way that the polyester alcohol obtained after the subsequent transesterification has a hydroxyl number (OHN) greater than 700 mg KOH/g, transesterifying the wastes dissolved in DEG and, if required or if desired, freed of solids, using known transesterification catalysts, with the ethylene glycol (EG) liberated in the process being at least partially distilled off, and cooling down to temp. below 140° C., distilling off free DEG at a temperature of below 140° C. from the transesterification product at equilibrium until a polyester alcohol having an OHN of 260–500 mg KOH/g and an oligomer content of not more than 1% by weight of oligomers having a degree of polymerization of greater than 6 is obtained.

2. The process as claimed in claim 1, wherein the dissolution of the wastes in DEG is carried out at a minimum temperature of 200–250° C.

3. The process as claimed in claim 1, wherein the dissolution process is carried out using only a part of the amount of DEG required and the remaining amount is added before the transesterification process after analytical characterization of the product.

4. The process as claimed in claim 1, wherein the wastes dissolved in DEG or filtered to remove solids present in the form of suspended materials or suspensions.

5. The process as claimed in claim 1, wherein during the transesterification the EG is distilled off to such an extent that the final product has a content of at most 10% by weight, of EG in free and bound forms.

6. The process as claimed in claim 1, wherein the transesterification is carried out at a pressure of 500–700 hPa and a product temperature of up to a maximum of 235° C.

7. The process as claimed in claim 1, wherein free DEG is distilled off at a temperature of at most 130° C. from the transesterification product at equilibrium.

8. The process as claimed in claim 4, wherein filter aids are used in the filtering.

9. The process as claimed in claim 5, wherein the final product has a content of at most 5% by weight of Eg.

10. The process as claimed in claim 1, wherein the oligomer content is not more than 0.5% by weight of the oligomers having a degree of polymerization greater than 6.

11. The process as claimed in claim 10, wherein said polyester alcohol is virtually free of oligomers having a degree of polymerization of greater than 6.

12. The process as claimed in claim 1, wherein the cooling down is to a temperature of at most 130° C.

* * * * *

UNITED STATES PATENT AND TRADEMARK OFFICE
CERTIFICATE OF CORRECTION

PATENT NO. : 5,948,828
DATED : September 7, 1999
INVENTOR(S) : Werner Reck

It is certified that error appears in the above-identified patent and that said Letters Patent is hereby corrected as shown below:

On the title page, item [54] and Column 1, line 1:

delete the title and insert the correct title

-- POLYOLS AND PROCESS FOR THEIR PREPARATION FROM PET WASTES AND WASTES FROM PET PRODUCTION --.

In column 6, claim 9, line 54, please delete "Eg" and insert -- EG -- thereof.

Signed and Sealed this

Twenty-fifth Day of April, 2000

Attest:

Q. TODD DICKINSON

*Attesting Officer*     *Director of Patents and Trademarks*